United States Patent
Utsunomiya (10) Patent No.: US 12,157,401 B2
(45) Date of Patent: Dec. 3, 2024

(54) POWER GENERATION CONTROL APPARATUS, VEHICLE, CONTROL METHOD, AND CONTROL PROGRAM

(71) Applicant: TOYOTA JIDOSHA KABUSHIKI KAISHA, Toyota (JP)

(72) Inventor: Takahiro Utsunomiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 476 days.

(21) Appl. No.: 17/645,601

(22) Filed: Dec. 22, 2021

(65) Prior Publication Data
US 2022/0266698 A1    Aug. 25, 2022

(30) Foreign Application Priority Data

Feb. 19, 2021 (JP) ................................ 2021-025672

(51) Int. Cl.
*B60L 8/00* (2006.01)
*B60L 53/20* (2019.01)
*B60L 53/51* (2019.01)

(52) U.S. Cl.
CPC ............. *B60L 8/003* (2013.01); *B60L 53/20* (2019.02); *B60L 53/51* (2019.02); *B60L 2210/10* (2013.01)

(58) Field of Classification Search
CPC .......... B60L 8/003; B60L 53/20; B60L 53/51; B60L 2210/10
See application file for complete search history.

(56) References Cited

U.S. PATENT DOCUMENTS

| | | | | |
|---|---|---|---|---|
| 10,476,280 B2* | 11/2019 | Fukushima | ........... | H02J 7/0048 |
| 10,752,127 B1* | 8/2020 | Miyake | ............... | H01M 10/425 |
| 11,121,558 B2* | 9/2021 | Masuda | .................... | H02J 7/02 |
| 2018/0105042 A1* | 4/2018 | Kuribara | ................. | B60L 58/10 |
| 2021/0155109 A1* | 5/2021 | Miyamoto | ............. | B60L 50/60 |
| 2022/0266698 A1* | 8/2022 | Utsunomiya | ............ | B60L 53/51 |
| 2022/0294253 A1* | 9/2022 | Takemoto | ............... | H02J 7/342 |

FOREIGN PATENT DOCUMENTS

JP         2020-89100 A      6/2020

OTHER PUBLICATIONS

U.S. Appl. No. 17/579,711, filed Jan. 20, 2022, 37 pages.

* cited by examiner

*Primary Examiner* — Kyle J Moody
(74) *Attorney, Agent, or Firm* — Oblon, McClelland, Maier & Neustadt, L.L.P.

(57) ABSTRACT

A solar ECU serving as a power generation control apparatus includes a solar DC-DC converter, an auxiliary DC-DC converter, an adjustment unit, and a correction unit. The solar DC-DC converter has an input side to which a solar panel mounted on a vehicle is connected. The auxiliary DC-DC converter has an input side to which an output side of the solar DC-DC converter is connected, and an output side to which an auxiliary battery is connected. The adjustment unit is configured to adjust an output power of the auxiliary DC-DC converter such that a voltage between the solar DC-DC converter and the auxiliary DC-DC converter becomes a predetermined value through control based on a predetermined control parameter. The correction unit is configured to correct the control parameter.

8 Claims, 6 Drawing Sheets

|  | STOPPED STATE | | | RUNNING STATE | |
| --- | --- | --- | --- | --- | --- |
|  | CHARGING PREPARATION STATE | DRIVE BATTERY CHARGING STATE | POWER SUPPLY POWER RETAINING CONTROL | AUXILIARY BATTERY POWER SUPPLY STATE | NO SUNLIGHT STATE |
| SOLAR DC-DC CONVERTER | MPPT CONTROL | MPPT CONTROL | | MPPT CONTROL | STOPPED |
| AUXILIARY DC-DC CONVERTER | INTERMEDIATE VOLTAGE RETAINING CONTROL | POWER SUPPLY POWER RETAINING CONTROL | INTERMEDIATE VOLTAGE RETAINING CONTROL | INTERMEDIATE VOLTAGE RETAINING CONTROL | STOPPED |
| STEP-UP DC-DC CONVERTER | STOPPED | INTERMEDIATE VOLTAGE RETAINING CONTROL | | STOPPED | STOPPED |

POWER GENERATION CONTROL APPARATUS, VEHICLE, CONTROL METHOD, AND CONTROL PROGRAM

CROSS-REFERENCE TO RELATED APPLICATION

This application claims priority to Japanese Patent Application No. 2021-025672 filed on Feb. 19, 2021, incorporated herein by reference in its entirety.

BACKGROUND

1. Technical Field

The disclosure relates to a power generation control apparatus, a vehicle, a control method, and a control program.

2. Description of Related Art

Japanese Unexamined Patent Application Publication No. 2020-089100 (JP 2020-089100 A) describes that, in an in-vehicle solar power generation system, electric power generated from a solar panel is supplied to any one of a drive battery, an auxiliary battery, and a solar battery in accordance with a state of a vehicle.

SUMMARY

When the drive battery and the auxiliary battery are charged with electric power generated by the solar panel, electric power can be stably supplied to the drive battery and the auxiliary battery by executing step-up and step-down control using the voltage of the solar battery as a reference voltage in the system described in JP 2020-089100 A. However, when the solar battery is omitted for cost reduction, it is desirable to control a reference voltage between the solar panel and each of the batteries at a constant value to achieve efficient charging of the batteries based on fluctuating electric power supplied from the solar panel.

However, the optimal value of a control parameter in the case where the reference voltage is controlled at a constant value varies due to the influence of aged degradation of circuit elements. When the control parameter is not optimal, a power loss occurs during charging of the batteries.

The disclosure provides a power generation control apparatus, a vehicle, a control method, and a control program capable of reducing a power loss during charging of a battery by configuring a control parameter such that the control parameter is correctable.

A first aspect of the disclosure relates to a power generation control apparatus. The power generation control apparatus includes a solar DC-DC converter, a battery DC-DC converter, an adjustment unit, and a correction unit. The solar DC-DC converter has an input side to which a solar panel mounted on a vehicle is connected. The battery DC-DC converter has an input side to which an output side of the solar DC-DC converter is connected, and an output side to which a battery is connected. The adjustment unit is configured to adjust an output power of the battery DC-DC converter such that a voltage between the solar DC-DC converter and the battery DC-DC converter becomes a predetermined value through control based on a predetermined control parameter. The correction unit is configured to correct the control parameter.

In the power generation control apparatus according to the above aspect, the solar panel, the solar DC-DC converter, the battery DC-DC converter, and the battery are connected in the stated order. In the power generation control apparatus, the adjustment unit adjusts the output power of the battery DC-DC converter such that the voltage at the input side of the battery DC-DC converter, which is a reference voltage that is a reference of electric power to be supplied to the battery, becomes the predetermined value through control based on the predetermined control parameter. The correction unit is configured to be capable of correcting the control parameter. With the power generation control apparatus, by configuring the control parameter as a correctable value, a power loss during charging the battery is reduced.

The power generation control apparatus according to the above aspect may further include a capacitor of which one end is connected to the output side of the solar DC-DC converter and the other end is connected to a ground of the vehicle.

The power generation control apparatus according to the above aspect includes the capacitor between the output side of the solar DC-DC converter that is a source to supply electric power to the battery and the ground. Therefore, with the power generation control apparatus, by providing the capacitor, fluctuations in reference voltage due to fluctuations in electric power generated in the solar panel are reduced.

In the power generation control apparatus according to the above aspect, the correction unit may be configured to correct the control parameter at a time when a predetermined period has elapsed from when the correction unit corrects the control parameter last time.

With the power generation control apparatus according to the above aspect, the quality in an operation to charge the battery is ensured by correcting the control parameter at intervals of the predetermined period.

In the power generation control apparatus according to the above aspect, the adjustment unit may be configured to execute feedback control using the control parameter, and the correction unit may be configured to correct the control parameter at a time when a waveform of the voltage during feedback control deviates from a proper state.

With the power generation control apparatus according to the above aspect, by correcting the control parameter when the waveform of the voltage of feedback control deviates from a proper state, the quality in an operation to charge the battery is ensured.

In the power generation control apparatus according to the above aspect, a plurality of sets of the battery and the battery DC-DC converter may be provided, and the correction unit may be configured to, at the time, correct the control parameter in the battery DC-DC converter subjected to adjustment by the adjustment unit.

With the power generation control apparatus according to the above aspect, the quality in a charging operation is ensured for each battery.

In the power generation control apparatus according to the above aspect, the adjustment unit may be configured to execute PID control that is feedback control, the control parameter may be a gain value in PID control, and the correction unit may be configured to, when an overshoot value and a voltage stability time are improved by changing a gain value to one of a positive side and a negative side based on an ultimate sensitivity method as compared to the unchanged gain value, execute a process of storing the changed gain value multiple times, and then, when an overshoot value and a voltage stability time are improved by changing a gain value to the other one of the positive side and the negative side based on the ultimate sensitivity method as compared to the unchanged gain value, execute a process of storing the changed gain value multiple times.

With the power generation control apparatus according to the above aspect, an optimal gain value can be corrected to efficiently charge the battery through correction based on the ultimate sensitivity method.

A second aspect of the disclosure relates to a vehicle. The vehicle includes the power generation control apparatus of any one of the above-described aspects, the solar panel installed on an exterior of a vehicle body, and the battery mounted on the vehicle body.

With the vehicle according to the above aspect, by configuring the control parameter as a correctable value, a power loss during charging the battery is reduced.

A third aspect of the disclosure relates to a control method for a power generation control apparatus. The power generation control apparatus includes a solar DC-DC converter, and a battery DC-DC converter. The solar DC-DC converter has an input side to which a solar panel mounted on a vehicle is connected. The battery DC-DC converter has an input side to which an output side of the solar DC-DC-DC converter is connected, and an output side to which a battery is connected to the output side. The control method is executed by a computer. The control method includes adjusting an output power of the battery DC-DC converter such that a voltage between the solar DC-DC converter and the battery DC-DC converter becomes a predetermined value through control based on a predetermined control parameter, and correcting the control parameter.

The control method according to the above aspect is applied to a power generation control apparatus in which the solar panel, the solar DC-DC converter, the battery DC-DC converter, and the battery are connected in the stated order. In the control method, the computer adjusts the output power of the battery DC-DC converter such that the voltage at the input side of the battery DC-DC converter, which is a reference voltage that is a reference of electric power to be supplied to the battery, becomes the predetermined value through control based on the predetermined control parameter. The computer corrects the control parameter. With the control method, by configuring the control parameter as a correctable value, a power loss during charging the battery is reduced.

A fourth aspect of the disclosure relates to a control program for controlling a power generation control apparatus. The power generation control apparatus includes a solar DC-DC converter and a battery DC-DC converter. The solar DC-DC converter has an input side to which a solar panel mounted on a vehicle is connected, and a battery DC-DC converter having an input side to which an output side of the solar DC-DC converter is connected, and an output side to which a battery is connected. The control program is executed on a computer. The control program includes adjusting an output power of the battery DC-DC converter such that a voltage between the solar DC-DC converter and the battery DC-DC converter becomes a predetermined value through control based on a predetermined control parameter, and correcting the control parameter.

The control program according to the above aspect controls a power generation control apparatus in which the solar panel, the solar DC-DC converter, the battery DC-DC converter, and the battery are connected in the stated order. The computer on which the control program is executed adjusts the output power of the battery DC-DC converter such that the voltage at the input side of the battery DC-DC converter, which is a reference voltage that is a reference of electric power to be supplied to the battery, becomes the predetermined value through control based on the predetermined control parameter. The computer corrects the control parameter. With the control program, by configuring the control parameter as a correctable value, a power loss during charging the battery is reduced.

According to the aspects of the disclosure, by configuring the control parameter as a correctable value, a power loss during charging the battery is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, example embodiments of the disclosure will be described with reference to the accompanying drawings.

First Embodiment

Figure 1:
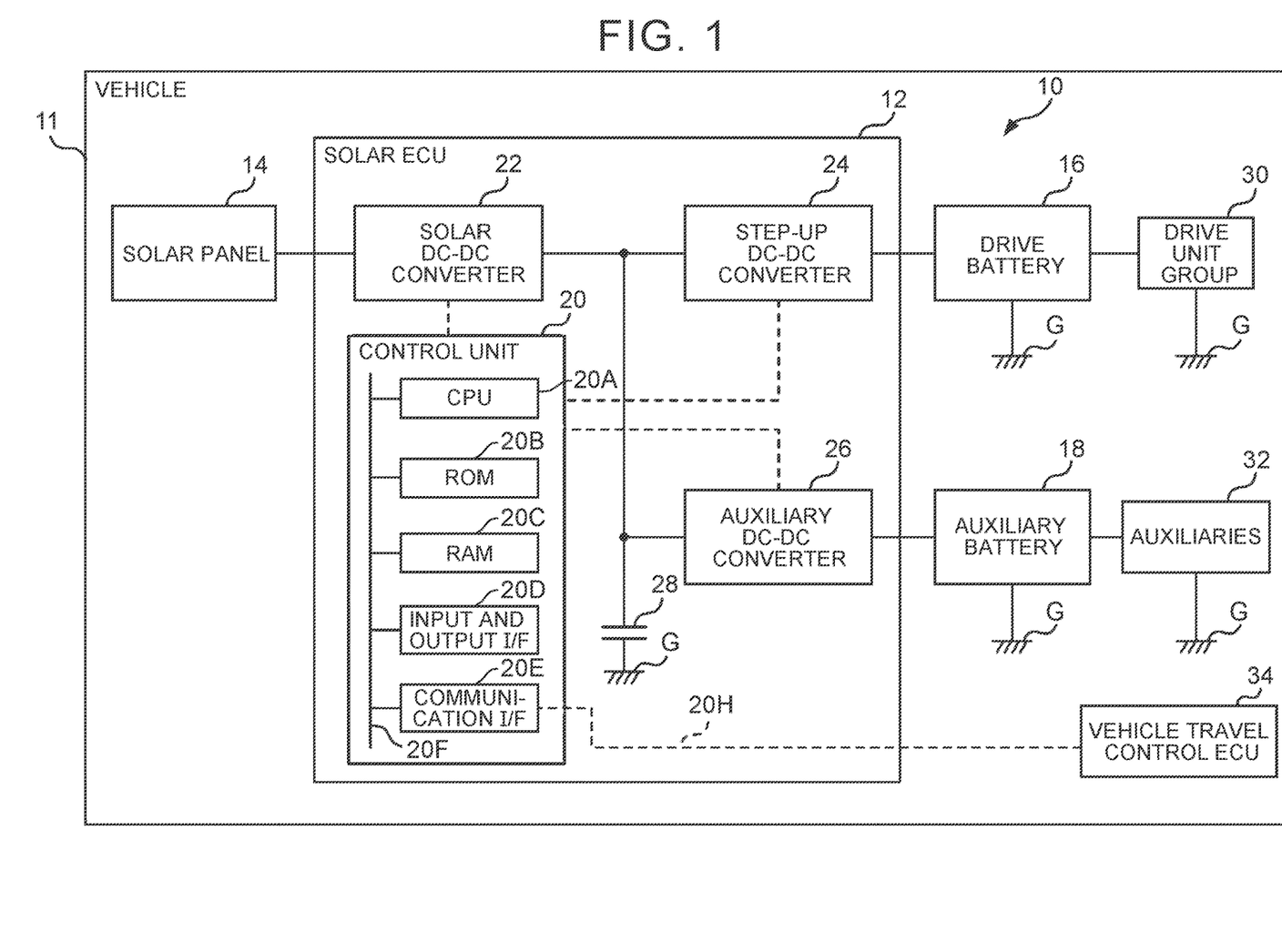
FIG. 1 is a schematic configuration diagram of a vehicle and a power generation control system according to a first embodiment.

As shown in FIG. 1, a power generation control system 10 of a first embodiment is mounted on a vehicle 11. An electric vehicle (EV) or a hybrid vehicle (HV) is illustrated as the vehicle 11. The vehicle 11 of the present embodiment includes a solar panel 14. The vehicle 11 is capable of supplying electric power generated by the solar panel 14 to a drive unit group 30, auxiliaries 32, and the like of the vehicle 11. In the present embodiment, a drive battery 16 (described later) and an auxiliary battery 18 (described later) are able to be charged with electric power generated by the solar panel 14.

The power generation control system 10 includes a solar ECU 12 serving as a power generation control apparatus, the solar panel 14, the drive battery 16, and the auxiliary battery 18. The solar ECU 12 has a function to control electric power generated by the solar panel 14. The details of the solar ECU 12 will be described later.

The solar panel 14 is a solar cell module that is a power generation apparatus that generates electric power upon receiving solar radiation. The solar panel 14 is installed on a roof or the like that is, for example, an exterior of the vehicle 11. The solar panel 14 is connected to a solar DC-DC converter 22 (described later) provided in the solar ECU 12.

The drive battery 16 is a high-voltage battery for operating the drive unit group 30 such as a drive motor associated with the drive of the vehicle 11. The drive battery 16 is made up of a chargeable and dischargeable secondary battery, such as a lithium ion battery and a nickel-metal hydride battery. The drive battery 16 is connected to a step-up DC-DC converter 24 (described later) provided in the solar ECU 12. The drive battery 16 is supplied with electric power from the step-up DC-DC converter 24. The drive battery 16 is connected to the drive motor via a power control unit that is a component of the drive unit group 30. The drive battery 16 supplies electric power to the drive motor during acceleration of the vehicle 11 or is supplied with electric power from the drive motor during deceleration.

The auxiliary battery 18 is a battery capable of operating the auxiliaries 32 other than devices associated with the drive of the vehicle 11. The auxiliary battery 18 is made up of a chargeable and dischargeable secondary battery, such as a lithium ion battery and a lead acid battery. The auxiliary battery 18 is connected to an auxiliary DC-DC converter 26 (described later) provided in the solar ECU 12. The auxiliary battery 18 is supplied with electric power from the auxiliary DC-DC converter 26. The auxiliary battery 18 is connected to the auxiliaries 32 of the vehicle 11 and supplies electric power to the auxiliaries 32.

The solar ECU 12 is provided between the solar panel 14 and each of the drive battery 16 and the auxiliary battery 18. The solar ECU 12 has a function to supply the drive battery 16 and the auxiliary battery 18 with electric power generated by the solar panel 14. The solar ECU 12 includes a control unit 20, the solar DC-DC converter 22, the step-up DC-DC converter 24, the auxiliary DC-DC converter 26, and a capacitor 28. The step-up DC-DC converter 24 and the auxiliary DC-DC converter 26 each are an example of a battery DC-DC converter.

The solar DC-DC converter 22 has a function to supply the step-up DC-DC converter 24 and the auxiliary DC-DC converter 26 with electric power generated by the solar panel 14. The solar DC-DC converter 22 has an input side and an output side. The solar panel 14 is connected to the input side. The step-up DC-DC converter 24 and the auxiliary DC-DC converter 26 are connected to the output side. At the time of supply of electric power, the solar DC-DC converter 22 converts (steps up or steps down) a voltage generated by the solar panel 14, which is an input voltage, to a predetermined voltage based on an instruction from the control unit 20 and outputs the predetermined voltage to the step-up DC-DC converter 24 and the auxiliary DC-DC converter 26.

The step-up DC-DC converter 24 has a function to supply the drive battery 16 with electric power output from the solar DC-DC converter 22. The step-up DC-DC converter 24 has an input side and an output side. The solar DC-DC converter 22 is connected to the input side. The drive battery 16 is connected to the output side. At the time of supply of electric power, the step-up DC-DC converter 24 converts (steps up) the output voltage of the solar DC-DC converter 22, which is an input voltage, to a predetermined voltage based on an instruction from the control unit 20 and outputs the predetermined voltage to the drive battery 16.

The auxiliary DC-DC converter 26 has a function to supply the auxiliary battery 18 with electric power output from the solar DC-DC converter 22. The auxiliary DC-DC converter 26 has an input side and an output side. The solar DC-DC converter 22 is connected to the input side. The auxiliary battery 18 is connected to the output side. At the time of supply of electric power, the auxiliary DC-DC converter 26 converts (steps down) the output voltage of the solar DC-DC converter 22, which is an input voltage, to a predetermined voltage based on an instruction from the control unit 20 and outputs the predetermined voltage to the auxiliary battery 18.

The capacitor 28 is inserted between the output side of the solar DC-DC converter 22 and a ground G. Where the voltage in an intermediate portion between the solar panel 14 and each of the drive battery 16 and the auxiliary battery 18 is an intermediate voltage V, the capacitor 28 reduces fluctuations in the intermediate voltage V due to fluctuations in electric power generated by the solar panel 14. The intermediate voltage V is a voltage at the output side of the solar DC-DC converter 22 and is also a voltage at the input side of each of the step-up DC-DC converter 24 and the auxiliary DC-DC converter 26. In other words, the intermediate voltage V is a reference voltage at the time when the drive battery 16 and the auxiliary battery 18 are charged.

The control unit 20 is made up of, for example, a microcontroller. The microcontroller has a function to control the solar DC-DC converter 22, the step-up DC-DC converter 24, and the auxiliary DC-DC converter 26. Thus, the control unit 20 supplies the drive battery 16 and the auxiliary battery 18 with electric power (voltage and current) generated by the solar panel 14 and charges the drive battery 16 and the auxiliary battery 18.

The control unit 20 includes a central processing unit (CPU) 20A, a read only memory (ROM) 20B, a random access memory (RAM) 20C, an input and output interface (I/F) 20D, and a communication I/F 20E. The CPU 20A, the ROM 20B, the RANI 20C, the input and output I/F 20D, and the communication I/F 20E are connected to one another via an internal bus 20F so as to be communicable.

The CPU 20A is a central processing unit. The CPU 20A runs various programs and controls various units. In other words, the CPU 20A reads out programs from the ROM 20B and runs the programs by using the RAM 20C as a work area.

Figure 2:
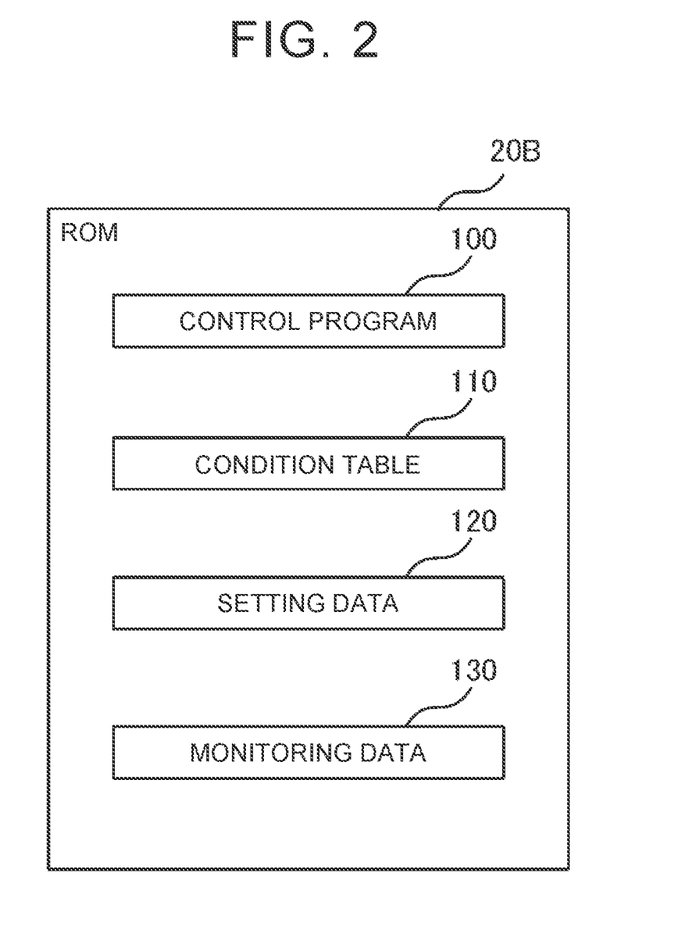
FIG. 2 is a block diagram showing the configuration of a ROM in a control unit of the first embodiment.

The ROM 20B stores various programs and various data. As shown in FIG. 2, a control program 100, a condition table 110, setting data 120, and monitoring data 130 are stored in the ROM 20B of the present embodiment.

The control program 100 is a program for controlling the control unit 20. The control unit 20 controlled in accordance with the control program controls the solar DC-DC converter 22, the step-up DC-DC converter 24, and the auxiliary DC-DC converter 26.

Figure 3:
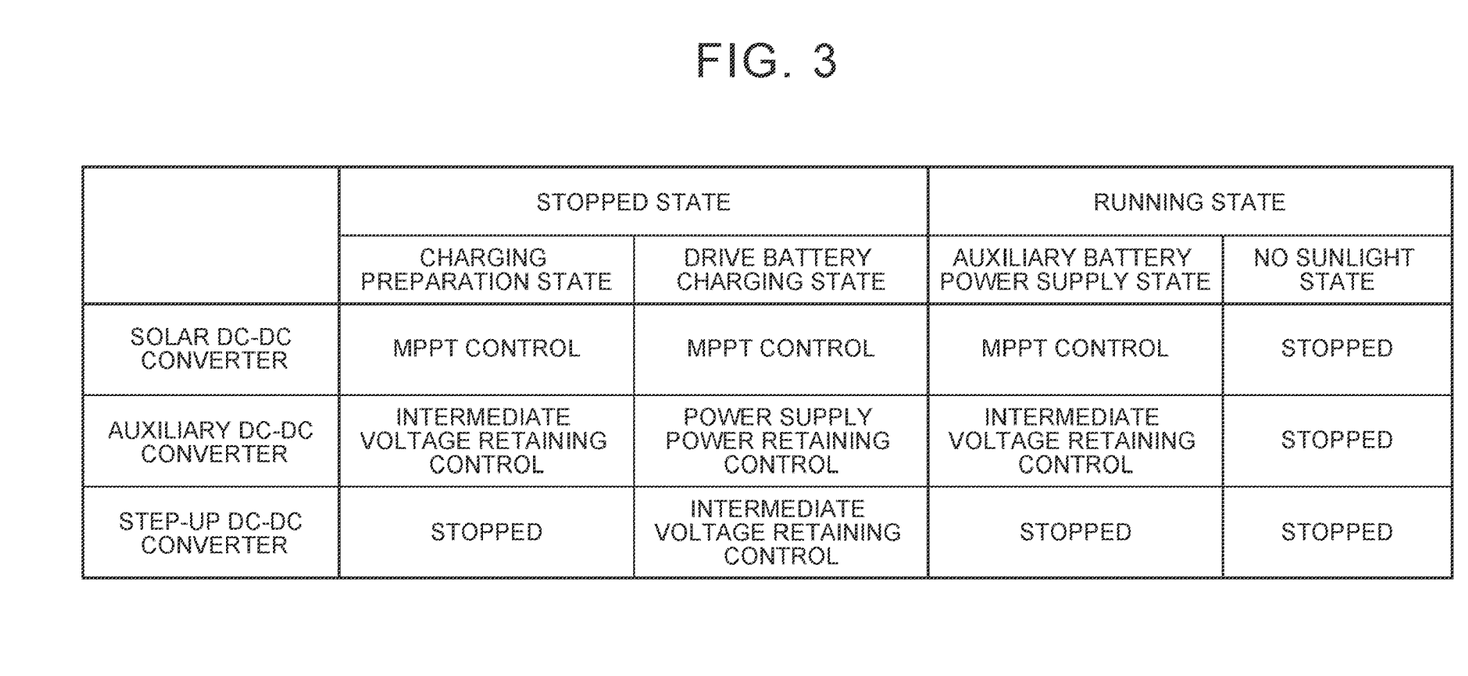
FIG. 3 is a view illustrating a condition table in the first embodiment.

The condition table 110 is a table that stores control conditions for the solar DC-DC converter 22, the step-up DC-DC converter 24, and the auxiliary DC-DC converter 26. As shown in FIG. 3, the condition table 110 stores a plurality of control conditions associated with a running status of the vehicle 11 and a power supply status.

Specifically, the running status includes "stopped state" and "running state" of the vehicle 11. A plurality of power supply statuses is set in association with a running status. A power supply status in a stopped state includes "charging preparation state" indicating that charging using the solar panel 14 is being prepared and "drive battery charging state" for charging the drive battery 16. A power supply status in a running state includes "auxiliary battery power supply state" for supplying electric power to the auxiliary battery and "no sunlight state" indicating that there is no sunlight and supply of power is stopped.

Here, the solar DC-DC converter 22 is prescribed to execute maximum power point tracking (MPPT) control in each power supply status, that is, the drive battery charging state and the auxiliary battery power supply state, during a charging preparation state other than no sunlight state.

MPPT control is control to find an optimal current value and an optimal voltage value that maximize output power at the time of power generation of the solar panel 14.

The step-up DC-DC converter 24 is prescribed to execute intermediate voltage retaining control in the drive battery charging state and to stop the control in the other power supply status. The intermediate voltage retaining control is control to adjust electric power output from a DC-DC converter such that the intermediate voltage V is held at a predetermined voltage value. In other words, the intermediate voltage retaining control is feedback control in which an input value is a voltage (intermediate voltage V) and a value to be operated is an electric power.

The auxiliary DC-DC converter 26 is prescribed to execute intermediate voltage retaining control in the charging preparation state and the auxiliary battery power supply state, to execute power supply power retaining control in the drive battery charging state, and to stop the control in no sunlight state. The power supply power retaining control is control to adjust electric power output from a DC-DC converter such that the electric power is held constant. In other words, the power supply power retaining control is feedback control using an input value and a value to be operated as an electric power.

As shown in FIG. 2, the setting data 120 stores gain values, that is, a proportional gain (P gain), an integral gain (I gain), and a derivative gain (D gain), that are control parameters in PID control as intermediate voltage retaining control. The setting data 120 stores gain values of each of the step-up DC-DC converter 24 and the auxiliary DC-DC converter 26, to which intermediate voltage retaining control is applied.

The monitoring data 130 is data storing the intermediate voltage V fed back in intermediate voltage retaining control.

As shown in FIG. 1, the RAM 20C temporarily stores a program or data as a work area.

The input and output I/F 20D is an interface for communicating with each of the solar DC-DC converter 22, the step-up DC-DC converter 24, and the auxiliary DC-DC converter 26 of the solar ECU 12.

The communication I/F 20E is an interface for connection with a vehicle travel control ECU 34 for controlling travel of the vehicle 11. For example, a communication standard based on a CAN protocol is used for the interface. The communication I/F 20E is connected to an external bus 20H. The vehicle travel control ECU 34 connected to the communication I/F 20E is not limited to a single ECU and may be a plurality of ECUs. The communication 1/F 20E may be connected to a communication module of a communication standard, such as 5G, LTE, and Wi-Fi (registered trademark). Thus, data of the intermediate voltage V can be transmitted to a device outside the vehicle 11.

The control unit 20 may include a storage as a storage unit in addition to the ROM 20B or instead of the ROM 20B. The storage is made up of, for example, a hard disk drive (HDD) or a solid state drive (SSD).

Figure 4:
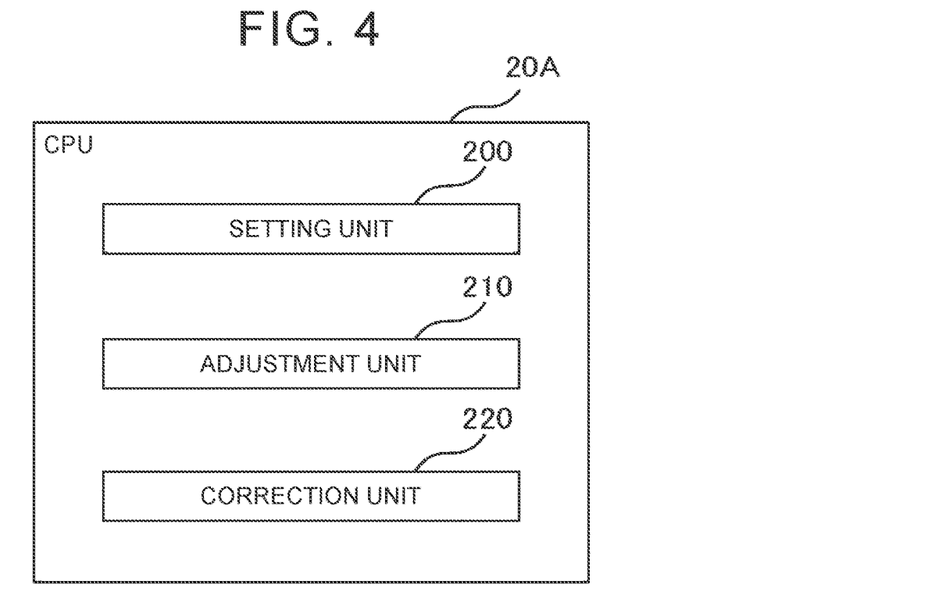
FIG. 4 is a block diagram showing the functional configuration of a CPU in the control unit of the first embodiment.

As shown in FIG. 4, in the control unit 20 of the present embodiment, the CPU 20A functions as a setting unit 200, an adjustment unit 210, and a correction unit 220 by running the control program 100.

The setting unit 200 has a function to set a control system for the solar DC-DC converter 22, the step-up DC-DC converter 24, and the auxiliary DC-DC converter 26. Specifically, the setting unit 200 sets a control system associated with a running status of the vehicle 11 and a power supply status, acquired by consulting the condition table 110.

The adjustment unit 210 has a function to adjust the output power of each of the solar DC-DC converter 22, the step-up DC-DC converter 24, and the auxiliary DC-DC converter 26 based on a control method set by the setting unit 200. Particularly, when the step-up DC-DC converter 24 and the auxiliary DC-DC converter 26 execute intermediate voltage retaining control, the adjustment unit 210 adjusts the output power of each of the step-up DC-DC converter 24 and the auxiliary DC-DC converter 26 such that the intermediate voltage V becomes a predetermined target value based on the gain values.

The correction unit 220 has a function to correct the gain values, that is, the P gain, the I gain, and the D gain, stored in the setting data 120. The correction unit 220 corrects the gain values at the time when a predetermined period has elapsed from when the correction unit 220 corrects the gain values last time.

Flow of Control

Figure 5:
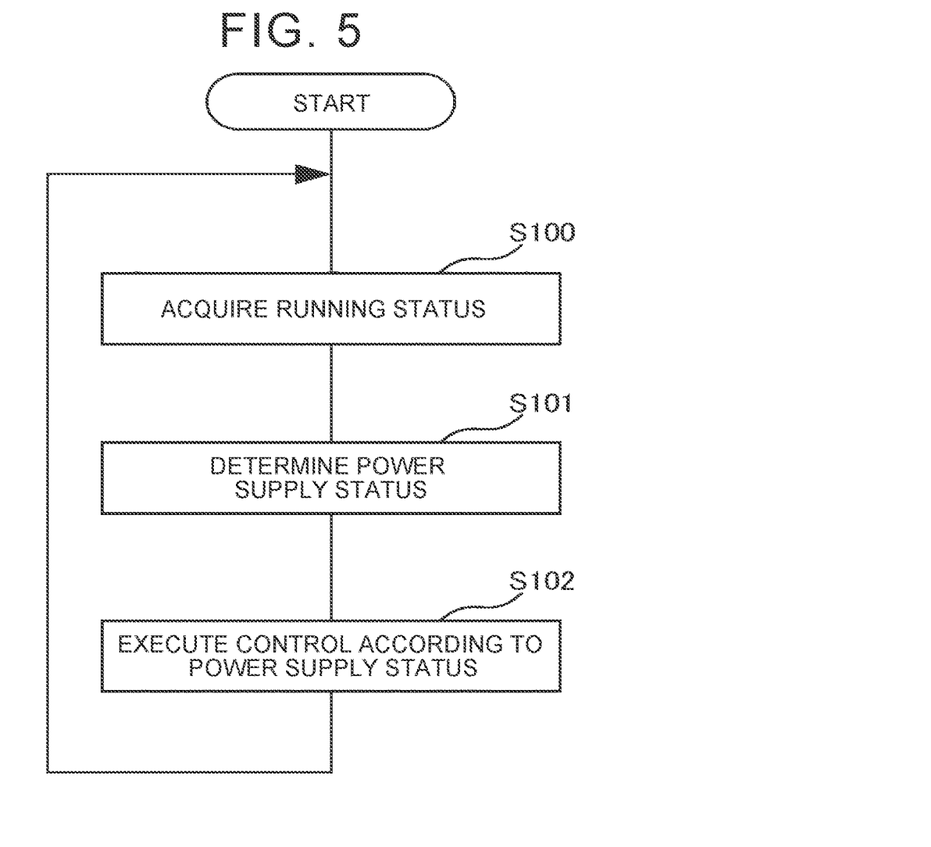
FIG. 5 is a flowchart showing the flow of a power control process in the first embodiment.

The flow of processes that are executed in the control unit 20 of the present embodiment will be described with reference to the flowcharts of FIG. 5 to FIG. 7. The processes in the control unit 20 are implemented by the CPU 20A functioning as the setting unit 200, the adjustment unit 210, and the correction unit 220.

Initially, a power control process of FIG. 5 will be described. In step S100 of FIG. 5, the CPU 20A acquires a running status. Specifically, the CPU 20A acquires the running status of the vehicle 11 from the vehicle travel control ECU 34.

In step S101, the CPU 20A determines a power supply status based on the acquired running status. Specifically, the CPU 20A determines the power supply status, that is, any one of (1) "charging preparation state" in the case where the running status is a stopped state, (2) "drive battery charging state" in the case where the running status is a stopped state, (3) "auxiliary battery power supply state" in the case where the running status is a running state, and (4) "no sunlight state" in the case where the running status is a running state, by consulting the condition table 110.

In step S102, the CPU 20A executes control according to the power supply status. In other words, the CPU 20A executes control over each of the solar DC-DC converter 22, the step-up DC-DC converter 24, and the auxiliary DC-DC converter 26 in accordance with the power supply status. Then, the CPU 20A returns to step S100.

Next, a monitoring process of FIG. 6 will be described. In the monitoring process, the CPU 20A executes a process related to determination as to whether to correct gain values and correction in order of the auxiliary DC-DC converter 26 and the step-up DC-DC converter 24.

Figure 6:
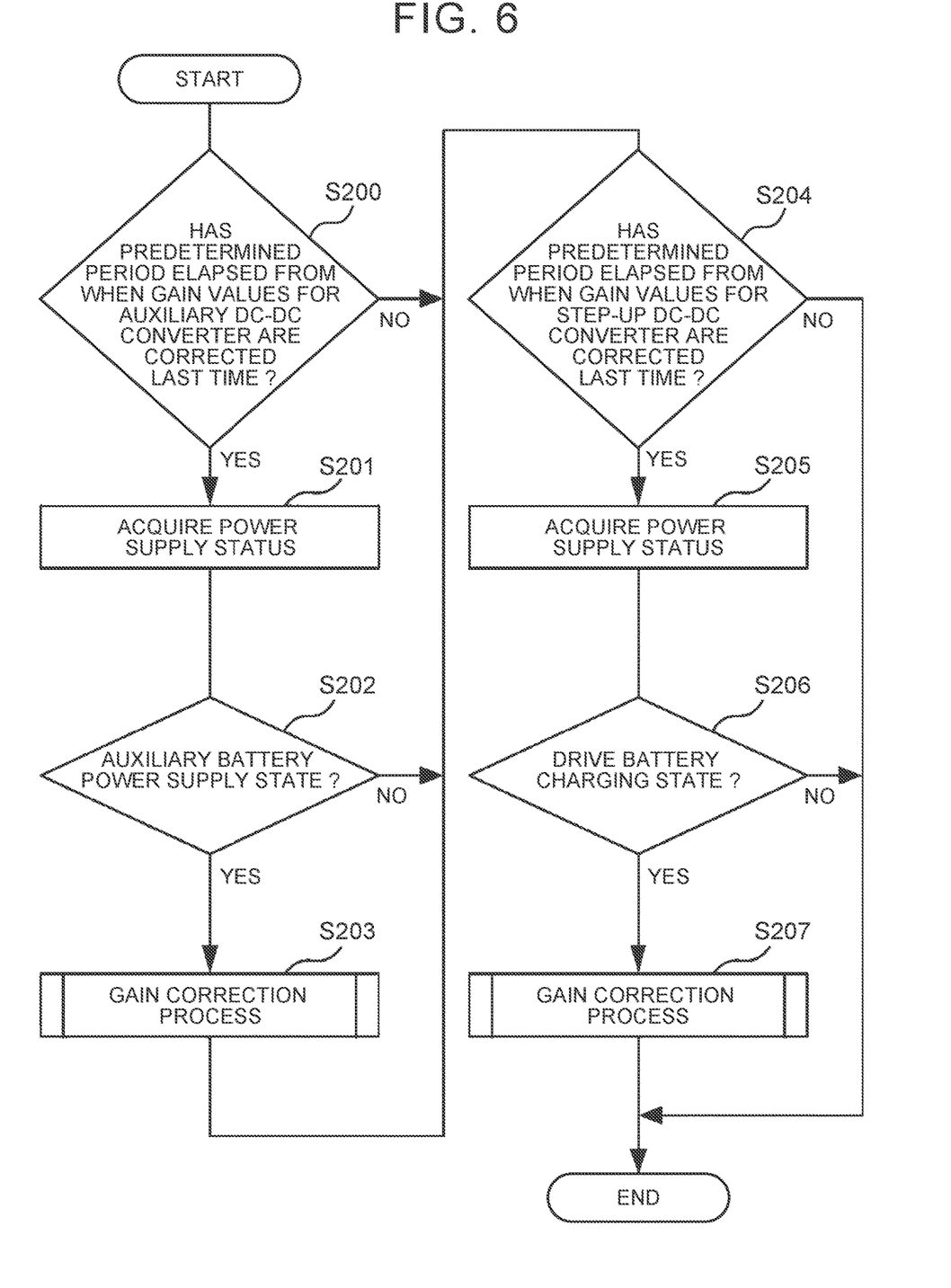
FIG. 6 is a flowchart showing the flow of a monitoring process in the first embodiment.
Figure 7:
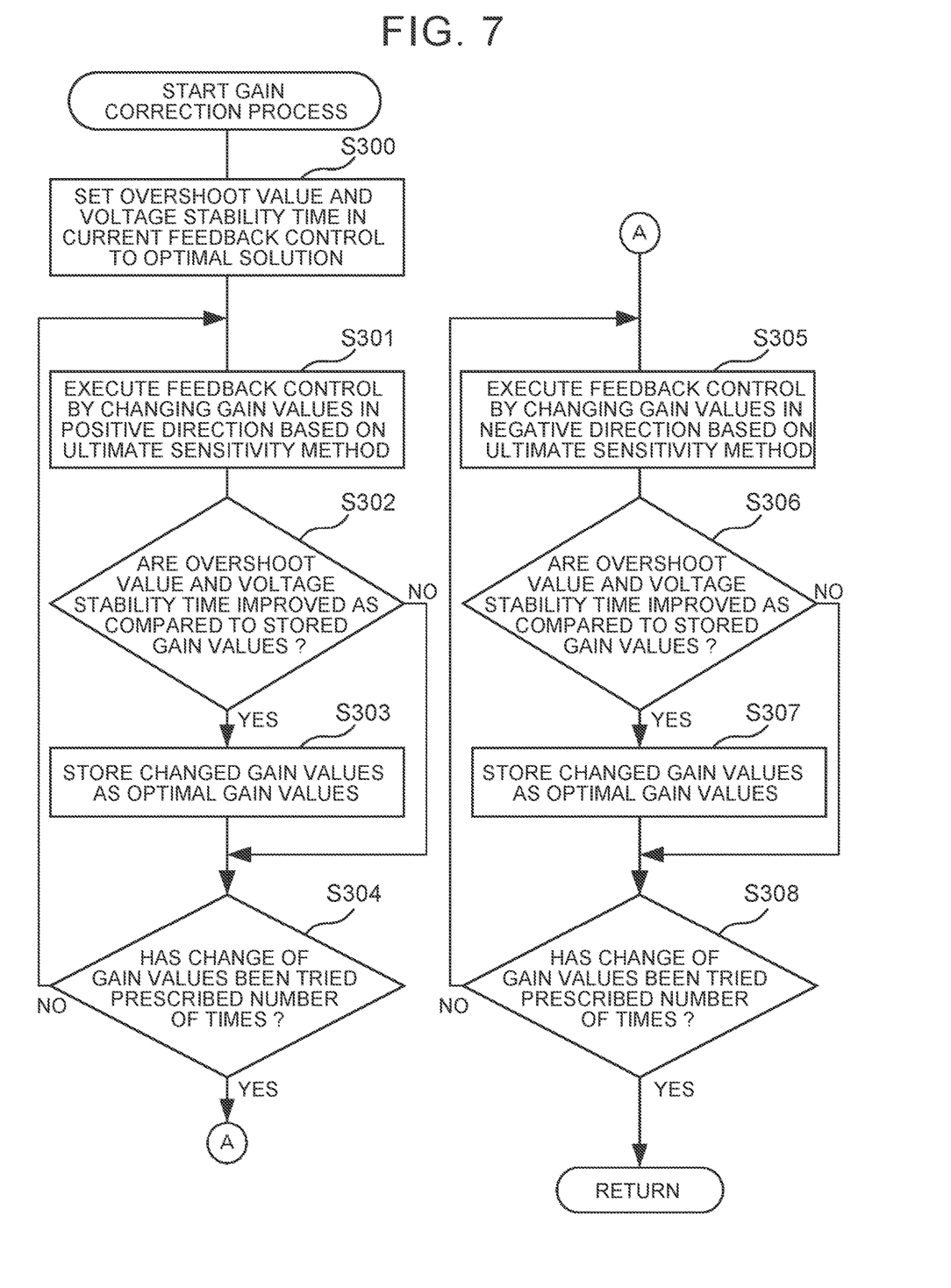
FIG. 7 is a flowchart showing the flow of a gain correction process in the first embodiment.

Initially, in step S200 of FIG. 6, the CPU 20A determines whether a predetermined period has elapsed from when the gain values for the auxiliary DC-DC converter 26 are corrected last time. When the CPU 20A determines that the predetermined period has elapsed (YES in step S200), the CPU 20A proceeds to step S201. On the other hand, when the CPU 20A determines that the predetermined period has not elapsed (NO in step S200), the CPU 20A proceeds to step S204.

In step S201, the CPU 20A acquires a power supply status.

In step S202, the CPU 20A determines whether the power supply status is an auxiliary battery power supply state in which the auxiliaries 32 and the auxiliary battery 18 are supplied with electric power. When the CPU 20A determines that the power supply status is the auxiliary battery power supply state (YES in step S202), the CPU 20A proceeds to step S203. On the other hand, when the CPU 20A determines that the power supply status is not the auxiliary battery power supply state (NO in step S202), the CPU 20A proceeds to step S204.

In step S203, the CPU 20A executes a gain correction process. The details of the gain correction process will be described later.

In step S204, the CPU 20A determines whether a predetermined period has elapsed from when the gain values for the step-up DC-DC converter 24 are corrected last time. When the CPU 20A determines that the predetermined period has elapsed (YES in step S204), the CPU 20A proceeds to step S205. On the other hand, when the CPU 20A determines that the predetermined period has not elapsed (NO in step S204), the CPU 20A ends the monitoring process.

In step S205, the CPU 20A acquires a power supply status.

In step S206, the CPU 20A determines whether the power supply status is a drive battery charging state in which the drive battery 16 is being charged. When the CPU 20A determines that the power supply status is the drive battery charging state (YES in step S206), the CPU 20A proceeds to step S207. On the other hand, when the CPU 20A determines that the power supply status is not the drive battery charging state (NO in step S206), the CPU 20A ends the monitoring process.

In step S207, the CPU 20A executes the gain correction process. The details of the gain correction process will be described later. Then, the CPU 20A ends the monitoring process.

Next, the gain correction process of FIG. 7 will be described. In step S300 of FIG. 7, the CPU 20A sets an overshoot value and a voltage stability time in current feedback control to an optimal solution.

In step S301, the CPU 20A executes feedback control by changing the gain values in a positive direction based on an ultimate sensitivity method.

In step S302, the CPU 20A determines whether the overshoot value and the voltage stability time are improved as compared to the gain values stored in the ROM 20B. When the CPU 20A determines that the overshoot value and the voltage stability time are improved, the CPU 20A proceeds to step S303. On the other hand, when the CPU 20A determines that the overshoot value and the voltage stability time are not improved, the CPU 20A proceeds to step S304.

In step S303, the CPU 20A stores the gain values changed in step S301 in the ROM 20B as optimal gain values.

In step S304, the CPU 20A determines whether a change of the gain values has been tried a prescribed number of times. Specifically, the CPU 20A determines whether the process of step S301, step S302, and step S303 has been executed the prescribed number of times. When the CPU 20A determines that a change of the gain values has been tried the prescribed number of times, the CPU 20A proceeds to step S305. On the other hand, when the CPU 20A determines that a change of the gain values has not been tried the prescribed number of times, the CPU 20A returns to step S301.

In step S305, the CPU 20A executes feedback control by changing the gain values in a negative direction based on the ultimate sensitivity method.

In step S306, the CPU 20A determines whether the overshoot value and the voltage stability time are improved as compared to the gain values stored in the ROM 20B. When the CPU 20A determines that the overshoot value and the voltage stability time are improved, the CPU 20A proceeds to step S307. On the other hand, when the CPU 20A determines that the overshoot value and the voltage stability time are not improved, the CPU 20A proceeds to step S308.

In step S307, the CPU 20A stores the gain values changed in step S305 in the ROM 20B as optimal gain values.

In step S308, the CPU 20A determines whether a change of the gain values has been tried a prescribed number of times. Specifically, the CPU 20A determines whether the process of step S305, step S306, and step S307 has been executed the prescribed number of times. When the CPU 20A determines that a change of the gain values has been tried the prescribed number of times, the CPU 20A ends the gain correction process and returns to the monitoring process. On the other hand, when the CPU 20A determines that a change of the gain values has not been tried the prescribed number of times, the CPU 20A returns to step S305.

Summary of Embodiment

The solar ECU 12 of the present embodiment includes the solar DC-DC converter 22, the step-up DC-DC converter 24, and the auxiliary DC-DC converter 26. In the solar ECU 12, the solar panel 14, the solar DC-DC converter 22, the step-up DC-DC converter 24, and the drive battery 16 are connected in the stated order from the solar panel 14 toward the drive battery 16. The solar panel 14, the solar DC-DC converter 22, the auxiliary DC-DC converter 26, and the auxiliary battery 18 are connected in the stated order from the solar panel 14 toward the auxiliary battery 18.

In the present embodiment, the control unit 20 controls the intermediate voltage V at the output side of the solar DC-DC converter 22 and the input side of each of the step-up DC-DC converter 24 and the auxiliary DC-DC converter 26 by executing intermediate voltage retaining control. In other words, the control unit 20 controls the output power such that the reference voltage at the output side of the solar DC-DC converter 22 that is a source to supply electric power to the drive battery 16 and the auxiliary battery 18 becomes a predetermined target value.

Here, which one of the step-up DC-DC converter 24 and the auxiliary DC-DC converter 26 is subjected to intermediate voltage retaining control by the control unit 20 is determined in accordance with a power supply status based on the condition table 110. According to the present embodiment, a reference voltage is created between the solar panel 14 and each battery. Thus, in the step-up DC-DC converter 24, a voltage step-up ratio can be kept constant, so electric power is efficiently supplied toward the drive battery 16. In the auxiliary DC-DC converter 26, a voltage step-down ratio can be kept constant, so electric power is efficiently supplied toward the auxiliary battery 18.

Particularly, according to the present embodiment, while the vehicle 11 is running, the auxiliary DC-DC converter 26 is subjected to intermediate voltage retaining control, so electric power is efficiently supplied toward the auxiliaries 32. While the vehicle 11 is stopped in the case of the charging preparation state in which a charging status of the solar panel 14 is checked, the auxiliary DC-DC converter 26 is subjected to intermediate voltage retaining control, so electric power is efficiently supplied toward the auxiliaries 32.

On the other hand, according to the present embodiment, in the case where the drive battery 16 is being charged, the step-up DC-DC converter 24 is subjected to intermediate voltage retaining control, so electric power is efficiently supplied from the auxiliary DC-DC converter 26 toward the auxiliaries 32.

According to the present embodiment, in a transitional situation resulting from fluctuations in electric power supplied from the solar panel 14, overshoot and oscillation of the intermediate voltage V are handled without mounting a solar battery.

In the solar ECU 12 of the present embodiment, the adjustment unit 210 executes PID control as intermediate voltage retaining control. Specifically, the adjustment unit 210 adjusts the step-up DC-DC converter 24 or the auxiliary DC-DC converter 26 so as to hold the intermediate voltage V at a constant value through feedback control based on gain values in PID control. According to the present embodiment, the correction unit 220 corrects gain values that are control parameters for each DC-DC converter, so a power loss during charging is reduced for each battery.

Gain values can be nonconforming due to a decrease in capacity caused by aging of the capacitor 28, individual variations, degradation of the solar panel 14, aged degradation of other circuit elements, or the like. In contrast, according to the present embodiment, the quality in an operation to charge the battery is ensured by correcting gain values for each predetermined period.

Second Embodiment

In the first embodiment, gain values that are control parameters are configured to be corrected at the time when a predetermined period has elapsed; however, the time to perform correction is not limited thereto. In a second embodiment, the correction unit 220 is configured to perform correction at the time when the waveform of the intermediate voltage V during feedback control deviates from a proper state.

Specifically, the CPU 20A of the control unit 20 is monitoring the waveform of the intermediate voltage V during feedback control and, when the waveform deviates from a proper state, executes the gain correction process. Here, the condition that the waveform is a proper state means, for example, a state where an overshoot value and a voltage stability time respectively satisfy preset values. In other words, in the present embodiment, in feedback control in intermediate voltage retaining control, when the intermediate voltage V excessively overshoots with respect to a target value or does not converge to the target value, gain values are corrected.

According to the present embodiment, by correcting the gain values when the waveform of the intermediate voltage V during feedback control deviates from a proper state, the quality in an operation to charge the battery is ensured.
Modification As a modification of the second embodiment, a device outside the vehicle 11 is configured to determine whether to correct parameters. In the present modification, by connecting a data communication module (DCM) that is a communication module to the communication I/F 20E directly or via another ECU, the waveform of the intermediate voltage V can be transmitted to a server outside the vehicle 11. When, for example, a server that manages a dealer acquires the waveform of the intermediate voltage V of the vehicle 11, whether to correct gain values can be determined at the dealer side. When it is determined that correction is needed, a user of the vehicle 11 is guided to bring the vehicle 11 to the dealer, with the result that gain values can be corrected at the dealer side.

According to the present modification, by monitoring the status of feedback of the intermediate voltage V in the external server, nonconformity of gain values due to aged degradation of circuit elements can be found remotely. By providing a function to provide a notification to the user of the vehicle 11, inspection on a failure or the like of hardware other than nonconformity of gain values can be performed at a dealer.
Remarks In the above-described embodiments, various processors other than a CPU may execute various processes executed by the CPU 20A reading out software (program) and running the software (program). Examples of the processors in this case include a programmable logic device (PLD) of which the circuit configuration is changeable after production, such as a field-programmable gate array (FPGA), and a dedicated electrical circuit that is a processor having a circuit configuration designed exclusively to execute a specific process, such as an application specific integrated circuit (ASIC). The above-described processes may be executed by one of these various processors or may be executed by a combination of two or more processors of the same type or different types (for example, a plurality of FPGAs, a combination of a CPU and an FPGA, or the like). The hardware structures of these various processors are more specifically electrical circuits made up of combinations of circuit elements, such as semiconductor elements.

In the above-described embodiments, a mode in which each program is stored (installed) in advance in a non-transitory computer-readable recording medium is described. For example, the control program 100 in the control unit 20 is stored in advance in the ROM 20B. However, the configuration is not limited thereto. Each program may be provided in a form recorded on a non-transitory recording medium, such as a compact disc read only memory (CD-ROM), a digital versatile read only memory (DVD-ROM), and a universal serial bus (USB) flash drive. A program may be in a form downloaded from an external device via a network.

The flows of processes described in the above embodiments are only illustrative. An unnecessary step may be deleted, a new step may be added, or the order of processing may be interchanged, without departing from the scope of the disclosure.

What is claimed is:

1. A power generation control apparatus comprising:
    a solar DC-DC converter having an input side to which a solar panel mounted on a vehicle is connected;
    a battery DC-DC converter having an input side to which an output side of the solar DC-DC converter is connected, and an output side to which a battery is connected;
    an adjustment unit configured to adjust an output power of the battery DC-DC converter such that a voltage between the solar DC-DC converter and the battery DC-DC converter becomes a predetermined value through control based on a predetermined control parameter; and
    a correction unit configured to correct the control parameter,
    wherein the correction unit is configured to correct the control parameter at a time when a predetermined period has elapsed from when the correction unit corrects the control parameter last time.

2. The power generation control apparatus according to claim 1, further comprising a capacitor of which one end is connected to the output side of the solar DC-DC converter and the other end is connected to a ground of the vehicle.

3. The power generation control apparatus according to claim 1 wherein:
the adjustment unit is configured to execute feedback control using the control parameter; and
the correction unit is configured to correct the control parameter at a time when a waveform of the voltage during feedback control deviates from a proper state.

4. The power generation control apparatus according to claim 1, wherein:
a plurality of sets of the battery and the battery DC-DC converter is provided; and
the correction unit is configured to, at the time, correct the control parameter in the battery DC-DC converter subjected to adjustment by the adjustment unit.

5. The power generation control apparatus according to claim 1, wherein:
the adjustment unit is configured to execute PID control that is feedback control;
the control parameter is a gain value in PID control; and
the correction unit is configured to
when an overshoot value and a voltage stability time are improved by changing a gain value to one of a positive side and a negative side based on an ultimate sensitivity method as compared to an unchanged gain value, execute a process of storing the changed gain value multiple times, and then
when an overshoot value and a voltage stability time are improved by changing a gain value to the other one of the positive side and the negative side based on the ultimate sensitivity method as compared to the unchanged gain value, execute a process of storing the changed gain value multiple times.

6. A vehicle comprising:
the power generation control apparatus according to claim 1;
the solar panel installed on an exterior of a vehicle body; and
the battery mounted on the vehicle body.

7. A control method for a power generation control apparatus, the power generation control apparatus including
a solar DC-DC converter having an input side to which a solar panel mounted on a vehicle is connected, and
a battery DC-DC converter having an input side to which an output side of the solar DC-DC converter is connected, and an output side to which a battery is connected, the control method being executed by a computer, the control method comprising:
adjusting an output power of the battery DC-DC converter such that a voltage between the solar DC-DC converter and the battery DC-DC converter becomes a predetermined value through control based on a predetermined control parameter; and
correcting the control parameter,
wherein the control parameter is corrected at a time when a predetermined period has elapsed from when the control parameter was corrected last time.

8. A control program for controlling a power generation control apparatus, the power generation control apparatus including
a solar DC-DC converter having an input side to which a solar panel mounted on a vehicle is connected, and
a battery DC-DC converter having an input side to which an output side of the solar DC-DC converter is connected, and an output side to which a battery is connected, the control program being executed on a computer, the control program comprising:
adjusting an output power of the battery DC-DC converter such that a voltage between the solar DC-DC converter and the battery DC-DC converter becomes a predetermined value through control based on a predetermined control parameter; and
correcting the control parameter,
wherein the control parameter is corrected at a time when a predetermined period has elapsed from when the control parameter was corrected last time.

* * * * *